United States Patent Office 3,419,693
Patented Dec. 31, 1968

3,419,693
CONTROL SWITCH FOR A FLUID PRESSURE SYSTEM
Percy Gould and Derek Firmager, Brighton, England, assignors, by mesne assignments, to Clifford Edwards Limited, Hove, Sussex, England, a corporation of Great Britain
Filed May 31, 1966, Ser. No. 564,458
Claims priority, application Great Britain, May 31, 1965, 23,138/65
4 Claims. (Cl. 200—83)

ABSTRACT OF THE DISCLOSURE

A pressure actuated control switch having a diaphragm exposed to the pressure to be controlled and connected to a movable contact movable between two stationary contacts. The contacts are connected in an electric circuit which has a signal terminal, the potential applied to the signal terminal changing when the movable contact moves into engagement with one of the stationary contacts after engaging the other stationary contact.

---

This invention relates to a pressure control switch for use in a fluid pressure system. One application of this switch is in a hydraulic system, for example an aircraft hydraulic system, where relatively high pressure of the order of up to 2,000 to 5,000 pounds per square inch are involved.

It is an object of the present invention to provide a switch which provides a differential between cut-in and cut-out levels of pressure and which has a high degree of accuracy.

According to the present invention there is provided a pressure control switch for a fluid pressure system, comprising a first stationary contact, a second stationary contact, a movable contact, and a diaphragm or the like arranged to be exposed to the pressure to be controlled to actuate said movable contact between a first end position where it engages the first stationary contact, an intermediate position where neither of the stationary contacts is engaged, and a second end position where it engages the second stationary contact.

Preferably, said stationary contacts are individually adjustable in position relative to said movable contact.

In high accuracy high-pressure switches it may be virtually essential to employ a thin sheet metal diaphragm and according to a further feature of the invention a thin rubber pad is arranged between the diaphragm and a movable piston which provides a connecting element between the diaphragm and said movable contact, to prevent permanent deformation of the diaphragm against the piston at high fluid pressures.

According to a further feature of the invention, first and second safety stops are arranged to limit the piston movement in each of its operating directions and so prevent damage to the diaphragm and to the switch mechanism.

Suitably, the switch includes an electrical circuit in which the contacts are connected and which has a signal terminal, the potential applied to the signal terminal changing when the movable contact moves into engagement with the first stationary contact and when it moves into engagement with the second stationary contact.

One of the applications of the switch according to the present invention is for controlling absolute pressures, and in this case the functional parts of the switch are arranged in a casing which is evacuated and hermetically sealed.

A pressure control switch in accordance with this invention will now be described with reference to the accompanying drawings of which:

Figure 1:
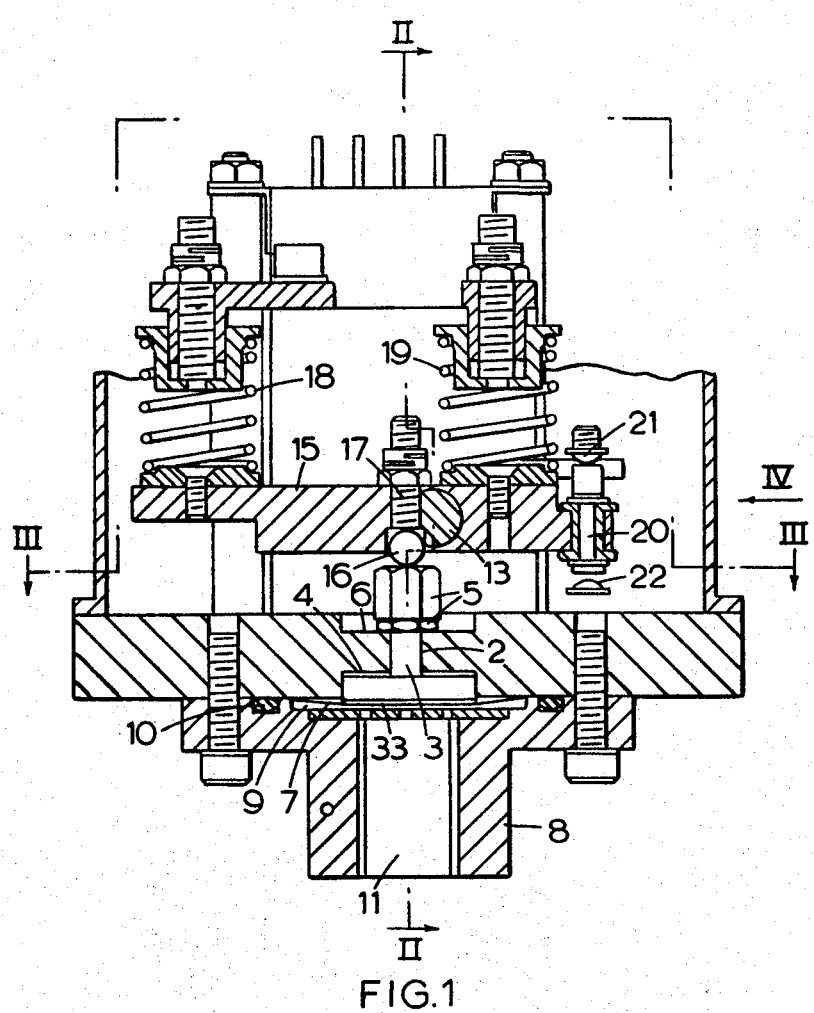
FIGURE 1 is a sectional elevation of the switch.
Figure 2:
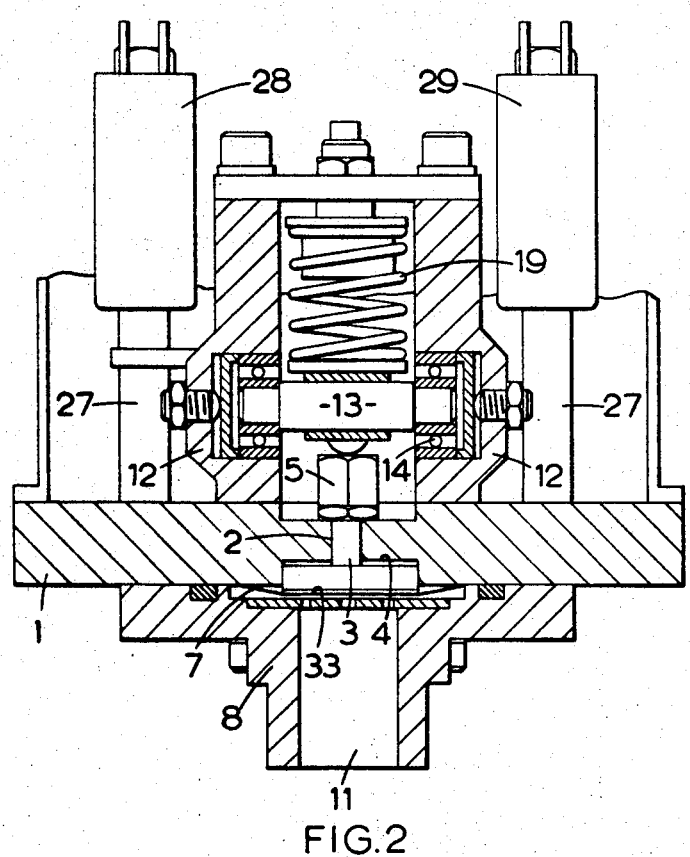
FIGURE 2 is a sectional elevation on the line II—II of FIGURE 1.

The switch has a base plate 1 having a stepped central bore 2 in which a piston 3 is movable through a short axial distance. The head of the piston 3 is a close fit within the corresponding part of the bore 2 which is formed with a shoulder 4 arranged to provide a first safety stop. The opposite (upper) end of the piston 3 is formed as a screwed stem and is provided with adjustable lock nuts 5 which are arranged to engage a top shoulder 6 of the bore 2 to provide a second safety stop in the reverse direction.

A diaphragm 7 is arranged across the lower face of the piston, the diaphragm being located in a pressure chamber 9 formed between the lower face of the base plate 1 and a recessed base member 8 which is secured to the base plate 1. An annular gas-filled sealing tube 10 is arranged around the periphery of the chamber 9 to seal the diaphragm 7 against the base plate 1. The base member 8 which clamps the periphery of the diaphragm 7, is formed with a central opening 11 which constitutes an inlet for pressure fluid from the system to be controlled.

Figure 4:
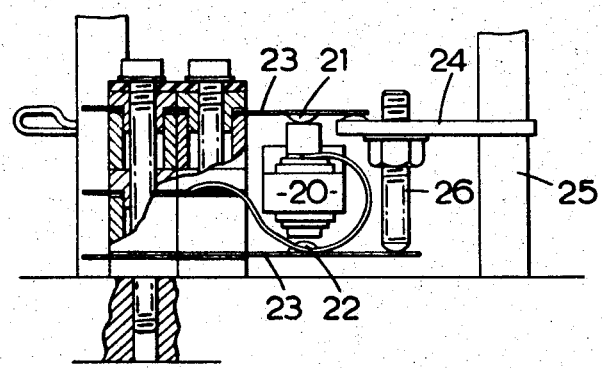
FIGURE 4 is a partial view in the direction of the arrow IV of FIGURE 1.
Figure 3:
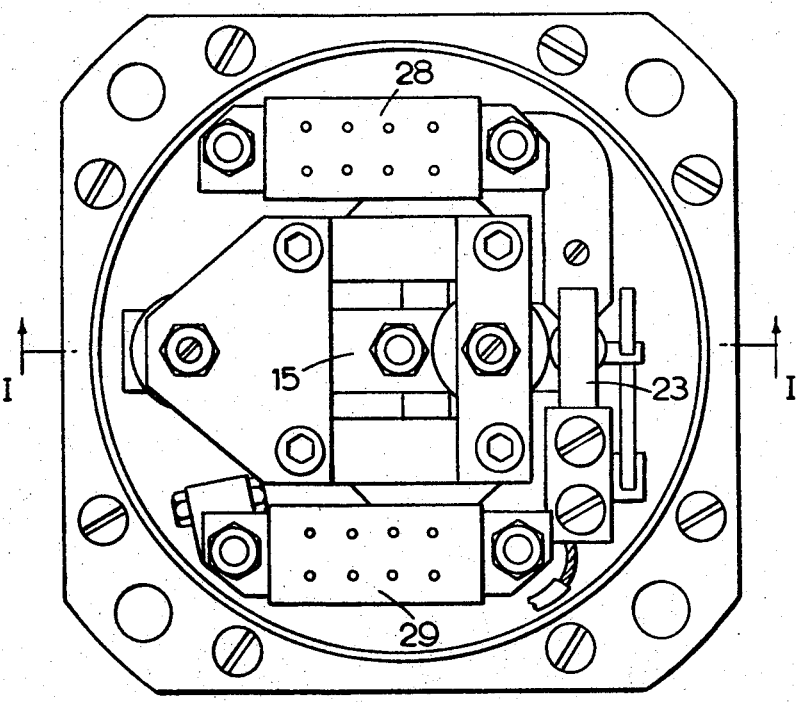
FIGURE 3 is an elevation on the line III—III of FIGURE 1, FIGURE 1 being taken on the line I—I of FIGURE 3.

A pair of columns 12 upstanding from the upper face of the base plate 1 carry a horizontal pivot 13, the ends of the pivot 13 being mounted in ball bearings 14. The pivot 13 carries an approximately horizontal pivotal lever 15 which is moved by the action of the diaphragm 7 and piston 3, the connection between the lever 15 and the piston 3 being through a ball 16 which is spaced a short distance from the lever fulcrum and abuts a stud 17 screwed into a tapped bore in the lever 15. Two opposed helical compression springs 18 and 19, located one on each side of the pivot 13, act downwardly on the upper face of the lever 15, and one end of the lever 15 carries a movable contact 20 having upper and lower surfaces. Adjacent to the movable contact 20 is arranged a pair of stationary contacts 21 and 22, the latter each constituting a metal contact carried by a spring arm 23. In the absence of the fluid supplied under pressure to inlet 11 movable contact 20 engages upper contact 21. A horizontal metal bar 24 is secured to a pair of upstanding stems 25 (only one stem 25 can be seen in FIGURE 4) to act as a fixed stop which limits downward movement of the upper spring arm 23. The lower spring arm 23 is arranged to be adjusted in position by means of a screw 26 which extends downwardly from the bar 24.

Figure 5:
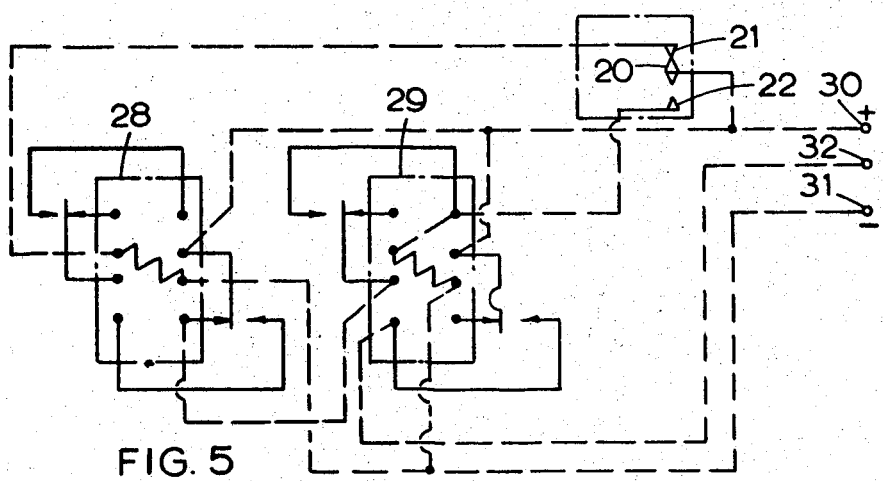
FIGURE 5 is an electrical circuit diagram of the switch.

Studs 27 extending upwardly from the plate 1 carry a pair of electrical relays 28 and 29 each of which includes a coil and two sets of contacts. Referring to FIGURE 5 when fluid under pressure is not supplied to inlet 11, the coil of relay 28 is connected between supply terminals 30 and 31 and is energised. As the movable contact 20 leaves the upper contact 21 the coil of relay 28 is de-energised. When the movable contact 20 "makes" with the bottom contact 22, the coil of relay 29 is energised which provides a signal at a terminal 32. Simultaneously the contacts of the relays 29 are brought to positions in which another path through contacts of relay 28 is provided to energise the coil of relay 29. When the movable contact 20 "breaks" from the bottom contact 22, the coil of relay 29 remains energised. When the movable contact 20 makes with the upper contact 21, relay 28 is energised which, through its contacts, de-energises relay 29 to remove the signal from terminal 32. It will be appreciated that relay 29 remains energised at all pressures above the "make" of the moving contact 20 and upper contact 21.

In operation of the switch, at zero pressure the movable contact 20 is in engagement with the upper stationary contact 21 and in this position the coil of relay 28 is energised. As pressure rises, the movable contact 20 travels downwardly and breaks engagement with the upper contact 21 and when this occurs the relay 28 is de-energised but the signal (zero potential) applied to the terminal 32 is not changed. The movable contact 20 remains out of engagement with both contacts 21 and 22 through a mid range of pressures and on the pressure rising above said mid range the movable contact 20 engages the lower stationary contact 22. When this occurs the relay 29 is energised and a signal is produced at the terminal 32. On the pressure falling to such an extent that the movable contact 20 moves out of engagement with the bottom stationary contact 22, the relay 29 remains energised. On the pressure falling to a predetermined lower value the movable contact 20 again engages the top stationary contact 21 and relay 28 is energised and relay 29 is de-energised and the signal is removed from the terminal 32.

The switch can thus operate a control or a warning device at first and second predetermined pressures which can be spaced apart at a large or small predetermined interval. For example, in controlling a fluid pressure system, the switch could be arranged to operate a pressure pump until the pressure in the system rises to 2,000 p.s.i. whereupon the pump cuts out and remains inactive until the pressure in the system falls to say 500 p.s.i.

It will also be appreciated that signals can be produced at the points of make and break, depending on the requirements of the switch.

The operating levels of the switch are readily adjustable. Adjustments of the operating pressure settings of the switch can be effected by adjustment of the helical compression springs 18 and 19 which act on the lever 15, in conjunction with adjustments on the relative positions between the contact 20 and the fixed contacts 21 and 22.

The lever 15 is adjustable in relation to the top contact through the centre stud 17 which constitutes part of the connection with the operating piston 3. The action of adjustment of the stud 17 also influences the position of the movable contact 20 in relation to the lower stationary contact 22, but compensation can be effected by moving the lower stationary contact 22 by the adjustable screw 26 carried by the fixed bar 24. This latter screw 26 can, of course, be employed to effect adjustment of the position of the lower contact 22 independently of contact 20.

In switches of this kind which are intended for use in conditions where a high degree of accuracy is essential it is extremely important to employ a diaphragm 7 formed of sheet metal, for example, thin stainless steel. One danger inherent in employing diaphragms of this kind is that when a very high pressure is applied the diaphragm tends to deform permanently around the adjacent piston head. To avoid this disadvantage there is provided, according to the invention, a rubber disc 33 arranged between the diaphragm 7 and the head of the piston 3. The rubber disc 33 deforms under conditions of high pressure thus shielding the relatively sharp edges of the piston head and so preventing permanent deformation of the diaphragm. It is of importance that the rubber disc should recover, as the resiliency of this disc does have an influence on the operating characteristics of the switch.

A further means by which the operating range or sensitivity of the switch can be varied is by providing an alternative range of piston diameters; this would, of course, involve providing a range of base plates having correspondingly dimensioned piston-receiving bores. It is found that, with the construction described above, the effective area on which the fluid pressure acts is slightly greater than the piston head area and increases and decreases as a function of the diameter of the piston head.

In a modification the aforementioned pair of relays is replaced by a single relay having a pair of coils each of which operates one double-pole switch.

We claim:

1. A pressure actuated electric control switch for a fluid pressure system comprising a frame, a diaphragm carried by said frame and exposed on one side thereof to the fluid pressure, a movable piston mechanically coupled to said diaphragm, a pivot rod carried by said frame, a lever rotatably carried by said pivot rod, a rubber pad between said movable piston and said diaphragm for preventing permanent deformation of the diaphragm by high fluid pressures impinging thereon, a first contact carried by said lever, spaced second and third contacts carried by said frame and straddling said first contact only one of which is engageable at one time with said first contact, means coupling said piston to a position on said lever spaced from said pivot rod so that an increase in pressure on said diaphragm causes said lever to rotate about the pivot rod in the direction to bring said first contact into engagement with said third fixed contact, spring means coacting with said lever to urge it in the direction to move the said first contact toward said second contact, and circuit means connected to said first, second and third contacts and including a signal output terminal whose potential changes between a first level when said first contact is moved to engage said third contact which level is maintained after said first contact becomes disengaged from said third contact and a second level when said first contact is moved into engagement with said second contact which level is maintained until said first contact engages said third contact.

2. Switch according to claim 1 wherein said coupling between said piston and said lever includes a screw thread disposed upon said piston, an adjustable lock nut threaded upon said screw thread, a screw threaded cavity disposed transversely into said lever, a threaded stud disposed in the threaded cavity in said lever, and a ball disposed between the end of said stud and the end of said lock nut, and wherein there is included means to adjust the relative position of said first, second and third contacts.

3. Switch according to claim 2 including first and second stops carried by said frame and wherein said spring means includes a pair of adjustable springs straddling said pivot rod.

4. Switch according to claim 1 wherein said circuit means includes a first and second relay, a first circuit connectable to a voltage source and connected to: (A) said first contact, (B) said third contact and (C) said second relay so that said second relay is energized when said first and third contacts engage for providing said first level signal; a second circuit to maintain said second relay energized when said first and third contacts disengage; and a third circuit connectable to said voltage source and connected to: (A) said first contact, (B) said second contact and (C) said first relay to energize said first relay and to de-energize said second relay and said second circuit when said first and second contacts engage for changing the signal on said signal terminal to said second level and to deenergize said first relay when said first and second contacts disengage while maintaining said second signal level.

References Cited

UNITED STATES PATENTS

| | | | |
|---|---|---|---|
| 2,745,089 | 5/1956 | Levy | 200—83 X |
| 3,109,908 | 11/1963 | Clason | 200—83.5 |
| 3,233,059 | 1/1966 | Pridham et al. | 200—83 |
| 3,260,816 | 7/1966 | Schad | 200—82.5 |

BERNARD A. GILHEANY, *Primary Examiner.*

HIRAM B. GILSON, *Assistant Examiner.*

U.S. Cl. X.R.

200—140